G. CLAUDE.
VACUUM DISCHARGE TUBE FOR LIGHTING PURPOSES.
APPLICATION FILED FEB. 27, 1911.
1,131,910.
Patented Mar. 16, 1915.
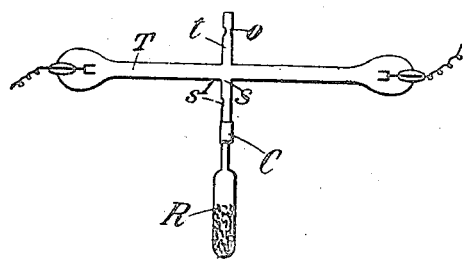
Witnesses:
Inventor:
Georges Claude
By Pennie & Goldsborough
Attys.

UNITED STATES PATENT OFFICE.

GEORGES CLAUDE, OF PARIS, FRANCE.

VACUUM DISCHARGE-TUBE FOR LIGHTING PURPOSES.

1,131,910.   Specification of Letters Patent.   Patented Mar. 16, 1915.

Application filed February 27, 1911. Serial No. 611,216.

*To all whom it may concern:*

Be it known that I, GEORGES CLAUDE, a citizen of the Republic of France, residing at 48 Rue St. Lazare, Paris, in the Republic of France, have invented certain new and useful Improvements in or Relating to Vacuum Discharge-Tubes for Lighting Purposes, of which the following is a specification.

The present invention relates to means for utilizing the luminescent properties of neon in order to constitute sources of light economical in use and of great brilliancy.

After numerous and unsuccessful experiments it has been ascertained that though the luminescent properties of neon are in point of fact very remarkable, it is not possible for them to maintain their manifestation in all their brilliancy in tubes in regular operation except under special conditions such as cannot easily be realized in practice.

It has been found, for instance, that the presence of a very small proportion of foreign gases or vapors largely increases the resistance of the tubes and impairs in a very surprising manner the luminous efficiency, multiplying the resistance of the tubes by ten for example and dividing the luminous power by a hundred. Even if the neon introduced into a tube is very pure, the gases that are occluded in the wall or in the electrodes and become liberated by the heating of the tube or by the passages of the electric current, reduce the luminous efficiency to a very low value and at the same time completely alter the color of the light. The fact that this condition of extreme purity has not hitherto been observed is the reason why the results obtained have left much to be desired, and the present invention has mainly for its object means whereby the desired conditions can be realized.

The necessity that has existed for dealing with pure gases has also resulted in another important fact being noted in the case of neon. This is that by reason of the exceptional weakness of the electrical cohesion of very pure neon, far higher pressures can be employed than with other gases (in the neighborhood of millimeters of mercury) and that these high pressures are favorable to high luminous efficiency. The employment of these comparatively high pressures presents the further great advantage that with quantities of luminescent gas of relatively equal magnitudes, the progressive occlusion by the walls or the electrodes that has been found to occur with other gases can be rendered negligible, so that the provision of a device for the progressive introduction of supplementary gas becomes unnecessary. A convenient way of obtaining this degree of purity, which constitutes the essential feature of the present invention, consists in manufacturing the luminescent tubes in the following manner, reference being made to the accompanying drawing. As shown, the tube T is connected hermetically, by soldering or by means of an air tight india-rubber connection $c$ or otherwise, with a glass or metal receptacle R filled with carbon. After there has been obtained by exhausting through $t$, by means of a pump or otherwise, a good vacuum in the interior of the tube and of the carbon receptacle, and after the internal humidity and the occluded gases expelled by the heat or by the passage of the current between the electrodes have been removed, the neon is introduced into the tube through a three-way cock until an appropriate pressure has been reached (2 centimeters of mercury for example). When this has been done, the lamp is sealed at O and the receptacle R containing the carbon is plunged into liquid air or nitrogen. An electric current is then intermittently passed through the tube. Two different purifying actions are then obtained. First, by the slow action of diffusion, all the molecules of the atmosphere of the tube pass in succession into the receptacle containing the carbon and the internal pressure in the tube diminishes owing to the absorption of the condensable gases by the carbon. However, this slow action of diffusion would not be sufficient in the case of the long tubes used for lighting purposes, but each time the current is passed through the tube, the expansion of the gases causes them to be forced into the carbon receptacle, where they are further purified. When the current discontinues, the pressure of the atmosphere in the tube decreases and the gases in the carbon receptacle rise again in a purified state. All the nitrogen, all the oxygen, and even the hydrogen and also a portion of the neon are soon absorbed. The current at first only passes between the electrodes with difficulty and produces a negligible luminosity, probably owing to the presence of traces of foreign gases yielded up by the walls or the electrodes of the tube. It is only after the lapse of a very long time (two or three hours or even longer), combined with the vigorous heating of the tube by the passage of the current, that the splendid luminescence of the unabsorbed neon appears in all its brilliancy and that the luminescent tube can be separated at S from the cooled carbon receptacle R. It will of course be understood that a number of tubes can be connected up to the same carbon receptacle. On the other hand, if the tube is very long, a plurality of appropriately distributed carbon receptacles can be connected to a single tube. Generally speaking, the arrangement may be rendered more industrial without effecting the principle of the invention, the essential feature of which consists in the means for enabling the neon to be freed, during the treatment itself, from the impurities that it contains or that are liberated.

The light produced by neon always contains a large excess of red rays. Mercury, by reason of its remarkable capacity for luminescence and its green radiation, which is almost complementary to that of neon, might be advantageous for correcting this light; it is however, found that if the least globule of mercury is introduced into the tube, as soon as the latter becomes heated by its operation, the tube is invaded by so much green mercury light that it is difficult to discern even with the spectroscope a few rays of the neon. It is, however, possible to employ correcting tubes arranged alongside the neon tubes. The arrangements indicated above permit of obtaining tubes of high luminous power which are capable of replacing arc lamps. With tubes from 40 to 45 mm. in diameter, for example, there is no difficulty in attaining luminous powers that have never hitherto been approached, namely from 300 to 400 candle power per meter of tube. My neon tubes are also applicable to the production of tubes of low luminous power, suitable for replacing incandescent electric lamps, for example. This result is so much the more important in that the great length of the tubes, the special properties of the light and the diversity of the forms that it is possible to give to these tubes by winding them spirally, bending them or forming various designs with them, such as letters for luminous advertising signs and the like, render it possible to obtain decorative or utilitarian effects of a very special character.

What I claim and desire to secure by Letters Patent of the United States is:—

1. In the manufacture of neon vacuum discharge tubes for lighting purposes in which approximately pure neon is introduced to the tube under reduced pressure, the improvement which consists in connecting the tube to a device into which the molecules of the atmosphere of the tube can pass in succession by diffusion and which contains material capable of absorbing the impurities contained in the neon, and then passing an intermittent current through the tube.

2. In the manufacture of neon vacuum discharge tubes for lighting purposes in which the gases contained in the tube are exhausted by a vacuum pump and in which approximately pure neon is introduced to the tube under reduced pressure, the improvement which consists in connecting the tube to a device into which the molecules of the atmosphere of the tube can pass in succession by diffusion and which contains material capable of absorbing the impurities contained in the neon, then passing an intermittent current through the tube, whereby the neon is purified by the slow action of diffusion and by the forcing of the gases into the absorption device due to the expansion of the gases by the electric current.

3. In the manufacture of neon vacuum discharge tubes for lighting purposes in which the gases contained in the tube are exhausted by a vacuum pump and in which approximately pure neon is introduced to the tube under reduced pressure, the improvement which consists in connecting the tube to a cooled carbon-containing receptacle maintained at a very low temperature for absorbing by diffusion the impurities contained in the neon, then passing an intermittent current through the tube whereby the impurities in the neon and those liberated from the electrodes and the walls of the tube are absorbed by the slow action of diffusion and by the forcing of the gases into the absorption device due to the expansion of the gases by the electric current.

4. In the manufacture of neon vacuum discharge tubes for lighting purposes in which the gases contained in the tube are exhausted by a vacuum pump and in which approximately pure neon is introduced to the tube under reduced pressure, the improvement which consists in connecting the tube to a device into which the molecules of the atmosphere of the tube can pass in succession by diffusion and which contains material capable of absorbing the impurities contained in the neon, then passing an intermittent current through the tube, whereby the neon is purified by the slow action of diffusion and by the forcing of the gases into the absorption device due to the expansion of the gases by the electric current, and finally separating the tube from the absorption device without destroying the vacuum.

5. In the manufacture of neon vacuum discharge tubes for lighting purposes in which the gases contained in the tube are exhausted by a vacuum pump and in which approximately pure neon is introduced to the tube under reduced pressure, the improvement which consists in connecting the tube to a cooled carbon-containing receptacle maintained at a very low temperature for absorbing by diffusion the impurities contained in the neon, then passing an intermittent current through the tube whereby the impurities in the neon and those liberated from the electrodes and the walls of the tube are absorbed by the slow action of diffusion and by the forcing of the gases into the absorption device due to the expansion of the gases by the electric current, and finally separating the tube from the absorption device without destroying the vacuum.

In testimony whereof I affix my signature in presence of two witnesses.

GEORGES CLAUDE.

Witnesses:
PIERRE HOURLIER,
DEAN B. MASON.